United States Patent
Fukunaga (12) 
(10) Patent No.: US 6,416,213 B1
(45) Date of Patent: Jul. 9, 2002

(54) DEVICE AND METHOD WITH SPIRAL MIXING PIPE FOR COAGULATING/CONDENSING WASTE WATER

(76) Inventor: Kazuji Fukunaga, 1755-4, Miyoshi, Okayama-shi, Okayama 703-8261 (JP)

( * ) Notice: Subject to any disclaimer, the term of this patent is extended or adjusted under 35 U.S.C. 154(b) by 0 days.

(21) Appl. No.: 09/600,740

(22) PCT Filed: Jan. 25, 1999

(86) PCT No.: PCT/JP99/00278

§ 371 (c)(1),
(2), (4) Date: Jul. 19, 2000

(87) PCT Pub. No.: WO99/37377

PCT Pub. Date: Jul. 29, 1999

(30) Foreign Application Priority Data

Jan. 26, 1998 (JP) ............................................ 10-049961
Apr. 13, 1998 (JP) ............................................ 10-140360

(51) Int. Cl.[7] .................................................. B01F 5/06
(52) U.S. Cl. ................................ 366/158.5; 366/181.5; 366/338; 138/114
(58) Field of Search ................................ 366/336, 338, 366/339, 181.5, 158.5; 138/114; 165/109.1, 155, 156

(56) References Cited

U.S. PATENT DOCUMENTS

| | | | | |
|---|---|---|---|---|
| 2,143,287 A | * | 1/1939 | Smith | |
| 3,323,585 A | * | 6/1967 | Cannon | |
| 3,335,790 A | * | 8/1967 | Aranyi et al. | |
| 5,046,548 A | * | 9/1991 | Tilly | |
| 6,119,769 A | * | 9/2000 | Yu et al. | |

FOREIGN PATENT DOCUMENTS

| | | | |
|---|---|---|---|
| FR | 2763868 | * | 12/1998 |
| JP | 55-061980 | * | 5/1980 |
| JP | 1-099699 | * | 4/1989 |
| JP | 2-052010 | * | 2/1990 |

* cited by examiner

*Primary Examiner*—Charles E. Cooley
(74) *Attorney, Agent, or Firm*—Koda & Androlia (57) ABSTRACT

A coagulating/condensing device including a spiral coagulating pipe composed of a spiral mixing pipe formed by inner and outer pipes of a multiple pipe with an inner pipe having an opening thereof formed in the outer pipe to face downstream to floc the solids by causing liquids at different electric potentials separately supplied from the inner and outer pipes to contact with each other.

7 Claims, 7 Drawing Sheets

DEVICE AND METHOD WITH SPIRAL MIXING PIPE FOR COAGULATING/ CONDENSING WASTE WATER

TECHNICAL FIELD

The invention relates to a coagulating/condensing device and method capable of precipitating fine particles at exceedingly higher velocities than natural settling velocity, without the use of any condensing agent, from thin contaminated liquids, while making use of electrolyte in the contaminated liquids as a condensing agent, and growing the fine particles further from mass-floc (giant floc) to coagulate and separate the liquids into highly rich sludge and a clear liquid.

BACKGROUND ART

Conventionally, a straight pipe has been used for a flocculating pipe (referred to a double pipe, in which two liquids in an injecting pipe and a mixing pipe are brought into laminar contact with each other). The longer the flocculating pipe, the higher it is in a treating capability (flocculating capability). The pipe involves many restrictions when many pipes having a length over several meters are to be installed in a site in order to treat a large quantity of a liquid, and has a disadvantage that an increase in installation cost is incurred when short flocculating pipes of increased number are used to provide the restrictions.

The inventors of this application have proposed (Japanese Patent Examined Publication Nos. 16563/1995 and 29119/1995) a coagulation apparatus and method for coagulating and separating fine particles [microorganism (activated sludge), algal, inorganic substance, plankton and so on] from a water being treated, containing fine particles and including brewery effluent, cultured growth liquids, dredge water and the like. To coagulate fine particles in an injected liquid and a water being treated (dredge water) in the coagulation apparatus, it is absolutely conditional to bring into laminar contact with each other two liquids different in electrolyte concentration (potential difference). That is, to effect laminar contact, a flow rate of a liquid being treated and supplied to a single mixing tube must be maintained at $Re<10^5$. Further, while the throughput is enhanced by causing a liquid being treated and a floc-containing liquid in the mixing tube to collide and mix with each other, a further enhancement of concentration of flocculated and concentrated sludge and miniaturization of an associated coagulating/condensing device have been desired in installing the coagulating/condensing device in existing solid-liquid separation sections.

Conventionally, a straight pipe has been used for a flocculating pipe (referred to a double pipe, in which two liquids in an injecting pipe and a mixing pipe are brought into laminar contact with each other). The longer the flocculating pipe, the higher it in a treating capability (flocculating capability). The pipe involves many restrictions when may pipes having a length over several meters are to be installed in a site in order to treat a large quantity of a liquid, and has a disadvantage that an increase in installation cost is incurred when short flocculating pipes of increased number are used to accommodate for such restrictions.

The longer (for example, over 4 meters) the flocculating pipe, the higher it is in treating capability, but irregularities, such as welding or the like, on connections are not allowable in obtaining a laminar flow, many restrictions on installation of an apparatus are involved, it takes many days to complete construction, and the apparatus is not easy to move and so lacks mobility. Hereupon, miniaturization enabling installation on a conveying vehicle while maintaining the flocculating capability has been highly demanded, and so a coagulating/condensing device coming in a range of existing solid-liquid separation sections has been a most important issue.

In such apparatus, a difference in electrolyte concentration between two liquids, that is, an injected liquid and a mixed liquid in a flocculating pipe is adjusted to be at least 0.1 mg/liter, the two liquids are brought into laminar contact with each other to maintain a difference of at least 0.1 mV in surface potential between fine particles of the two liquids at liquid interface and a concentration of pollution is continuously maintained to keep a distance between particles of the two liquids within 100 Å (angstrom), which causes collision and flocculation to form floc in a moment. However, there is a disadvantage that flocculation will not result when the apparatus undergoes minute vibrations or the like to break a laminar interface between the two liquids, resulting in mixing of the two liquids. Therefore, it is an inevitable problem in outdoor apparatuses to prevent vibrations of a lengthy flocculating pipe.

Conventionally, there has been involved a disadvantage that floc taken out from an overflow weir of a floc forming tank in a manner of straight pipe or sloped plate is excessively giant (30 to 40 mm) to be great in fall velocity to cause a great resistance between it and a stagnant water to produce many small particles peeling off the giant floc falling down the sloped plate, and when the giant floc begins to fall down the sloped plate, a clean liquid in a floc forming tank is suddenly made pollutant by such peeled-off particles rising in a gap between wall of the floc forming tank and the sloped plate, and the concentrating capability in a bottom of the solid-liquid separation unit is degraded at the same time. An apparatus intended for flocculating separation for obtaining a clean liquid needs a system for continuously treating such peeled-off particles and a device for prevention of peeling-off on the sloped plate.

With the above-mentioned Japanese Patent Examined Publication Nos. 16563/1995 and 29119/1995, floc formed in a mixing pipe collides with pollutant fine particles within a floc forming tank to produce a mass-floc, and there are involved restrictions that an injected liquid and a mixed liquid be made to perform laminar contact. Since a quantity of a liquid containing therein floc in a treated liquid per a flocculating pipe, which is straight, is small, a mass-floc is formed within the floc forming tank even when a liquid being treated is increased to three to three hundreds of times the liquid containing therein floc from the flocculating pipe for the purpose of treating a large quantity of a liquid being treated, but peeling-off of small particles from floc surfaces is violently caused when floc becomes 35 mm or more in diameter during falling and transferring of the mass-floc to the solid-liquid separation unit through the sloped plate. Accordingly, a demand has been made for development of a means for tranferring in a state of less peeling-off a giant floc produced upon collision and mixing of the floc with a liquid being treated, 10 to 50 times or more a liquid containing therein floc, and for a method capable of increasing a liquid being treated, to 10 to 50 times or more a liquid containing therein floc. Also, miniaturization enabling installation on a vehicle has been highly demanded, and further a coagulating/condensing device coming in a range of existing solid-liquid separation sections has been a most important issue.

In a papermaking process in paper manufacturing, a large quantity of a flocculating agent is used in flocculating a large quantity of waste water (referred to as a thin contaminated liquid) containing thin fine fiber particles below a screen. So, a demand has been made for a coagulating/condensing device and a coagulating/condensing method for performing a flocculating treatment without the use of a flocculating agent in flocculating a large quantity of thin contaminated liquid.

Since any flocculating agent cannot be used in precipitation in a washing (harshness removing) process of food materials from thick fine particles, concern is felt for precipitation. So, a demand has been made for development of a coagulating/condensing device and a coagulating/condensing method, any flocculating agent is not used, a time for the washing process is shortened, and a yield rate is high in the washing process. In particular, it is necessary to develop a solid-liquid separation device for removing a major part of a liquid by means of an inexpensive coagulating/condensing device before an expensive device is used in filtration and deliquoring in a process of separating fine particles and a large quantity of liquid from each other.

A coagulating/condensing device and a coagulating/condensing method, which the inventors of this application make an object of the invention, involve a maximum disadvantage that a mass-floc cannot be formed, even when a liquid being treated is supplied, in the case where a floc-containing liquid is not present, in which floc is formed by laminar contact of an injected liquid and a mixed liquid. So, floc is not formed when either of the two liquids is not supplied into a mixing pipe, with the result that a non-flocculated contaminated liquid is discharged to public water. Most waste water treatment apparatuses run in unattended operation at night, and a demand has been made for a coagulating/condensing device and a coagulating/condensing method, by which the above-mentioned problem is solved.

DISCLOSURE OF THE INVENTION

The inventors of this application have solved the above-mentioned problem in technology in a coagulating/condensing device and a coagulating/condensing method by providing a coagulating/condensing device and a coagulating/condensing method described in the following items (1) to (8), and enabled concentration and separation of a water being treated, into a high-concentration sludge and a clean liquid, and miniaturization enabling installation on a vehicle.

(1) A coagulating/condensing device for causing liquids at different electric potentials containing fine particles to flow down through inner and outer pipes, respectively, of a multiple pipe and for causing liquids in the inner and outer pipes to contact with each other downstream to make fine particle floc, the device comprising a spiral coagulating pipe composed of a spiral mixing pipe formed by the inner and outer pipes of the multiple pipe, the inner pipe having an opening thereof formed in the outer pipe to face downstream, solid being made floc by causing liquids at different electric potentials separately supplied from the inner and outer pipes to contact with each other.

In addition, the term "spiral" used in this application generally refers to arcuate, spiral, coil or the like, which involve bending. A liquid supplied flows down in a planar manner or with a difference in level while following an entire circumference of a spiral circle or the same several times or a part of the same.

(2) A coagulating/condensing device comprising a liquid supplying unit for supplying a liquid being treated containing fine particles, and a solid-liquid separation unit disposed in a lower position than the liquid supplying unit, the liquid supplying unit comprising a delivering chamber for delivering a liquid being treated, and a liquid dispersing chamber, and wherein a spiral mixing pipe for permitting a liquid from the liquid dispersing chamber to flow down therethrough, and an amount increasing pipe for supplying from the delivering chamber a liquid being treated join together at a merging portion disposed downstream, a spiral injection pipe with an opening facing downstream is provided in the spiral mixing pipe, two liquids at different electric potentials supplied separately to the spiral mixing pipe and the spiral injection pipe are caused to contact with each other at the opening to form a floc-containing liquid, and the floc-containing liquid is further made to mix with the liquid being treated at the merging portion downstream of the amount increasing pipe to form a mass-floc. (3) This embodiment of the device further includes a colliding/mixing unit provided in the vicinity of a portion where an end of the mixing pipe having therein an opening of an end of the injection pipe merges with a liquid, which flows down through the amount increasing pipe.

The colliding/mixing unit referred to here suffices to be a construction having a function of equalizing floc in diameter and preventing formation of fat floc (35 mm or more), which is liable to peel off upon collision with a liquid being treated, and can be typified by a construction, in which a plurality of nozzles and orifice perforated plates are alternately combined with each other to be provided in a mixing pipe, and which equalizes floc in diameter by repeated collision and dispersion.

(4) A coagulating/condensing device composed of a solid-liquid separation unit and a delivering chamber and a liquid dispersing chamber, both of which are disposed above the solid-liquid separation unit, and further comprising a spiral mixing pipe provided in a spiral amount increasing pipe extended from the delivering chamber for permitting a liquid from the liquid dispersing chamber to flow down therethrough, and a spiral injection pipe provided inside the spiral mixing pipe and having an opening facing downstream, and wherein the spiral amount increasing pipe, the spiral mixing pipe and the spiral injection pipe constitute a spiral triple pipe, and two liquids at different electric potentials supplied separately to the spiral mixing pipe and the spiral injection pipe are caused to contact with each other at the opening to be made a floc-containing liquid, which further mixes with the liquid being treated at the merging portion downstream of the amount increasing pipe to be made a mass-floc.

(5) This embodiment of the device further includes a bracket for supporting the injection pipe or the mixing pipe within the mixing pipe or the amount increasing pipe in a coaxial manner. The bracket includes a plurality of vane portions, which are contacted with and supported by the pipe inner wall at predetermined intervals with the vane portions being sharpened at an upstream or downstream side thereof to reduce flow resistance.

(6) A coagulating/condensing device composed of a delivering chamber and a liquid dispersing chamber, both of which are disposed above a solid-liquid separation unit, and further comprising a spiral mixing pipe for permitting a liquid from the liquid dispersing chamber to flow down therethrough, the spiral mixing pipe being made to merge on a downstream side with a spiral amount increasing pipe extended from the delivering chamber, a spiral injection pipe provided inside the spiral mixing pipe to be opened in a downstream direction, a floc forming tank provided to have a lower portion thereof closed and disposed in the solid-liquid separation unit, the spiral amount increasing pipe having an end thereof disposed inside the floc forming tank, and a spiral down comer provided outside or inside the floc forming tank and having an end thereof opened to the solid-liquid separation unit.

(7) A coagulating/condensing device composed of a delivering chamber and a liquid dispersing chamber, both of which are disposed above a solid-liquid separation unit, and further comprising a plurality of spiral mixing pipes for permitting a liquid from the liquid dispersing chamber to flow down therethrough, the plurality of spiral mixing pipes being made to merge on a downstream side with a plurality of spiral amount increasing pipes extended from the delivering chamber, or the plurality of spiral mixing pipes being provided in the plurality of spiral amount increasing pipes to constitute multiple pipes, spiral injection pipes provided inside the respective spiral mixing pipes to be opened in a downstream direction, a floc forming tank provided to have a lower portion thereof closed and disposed in the solid-liquid separation unit, the plurality of spiral amount increasing pipes having ends thereof disposed inside the floc forming tank, and a spiral down comer provided extended from the floc forming tank.

(8) A coagulating/condensing method comprising the steps of: causing an injected liquid and a scattered liquid, both of which are at different electric potentials, to flow down by way of a mixing pipe composed of an outer pipe and an inner pipe, each of which is formed in a spiral configuration, bringing the liquids into contact with each other on a downstream side to make a floc-containing liquid, and mixing the floc-containing liquid with a liquid being treated containing therein fine particles, to form mass-floc to thereby perform solid-liquid separation.

BEST MODE FOR CARRYING OUT THE INVENTION

The invention will be described in details with reference to the accompanying drawings.

In an embodiment shown in FIG. 1, a coagulating/condensing device comprises a liquid feed unit 1 and a solid-liquid separation unit 2 disposed below the liquid feed unit. As the solid-liquid separation unit 2 an existing installation can be used, which has a capability of solid-liquid separation as described below. The liquid feed unit 1 is composed of a distribution room 3 for distributing a liquid being treated containing fine particles, and a dispersion liquid room 4. In such coagulating/condensing device, a spiral mixing pipe 5 for permitting a liquid from the dispersion liquid room 4 to flow down therethrough, and an amounting increasing pipe 6 for permitting a liquid being treated to flow down therethrough from the distribution room 3 merge together at a merging portion 7 disposed downstream. Provided in the spiral mixing pipe 5 is a spiral injection pipe 9 having therein an opening 8 facing downstream. Two liquids at different electric potentials separately supplied into the spiral mixing pipe 5 and the spiral injection pipe 9 are brought into contact at the opening 8 with each other to form floc, thus providing a floc-containing liquid. Accordingly, a double pipe composed of the spiral mixing pipe 5 and the spiral injection pipe 9 constitutes a coagulating pipe. Preferably, contact is performed in a state of laminar flow. The floc-containing liquid is made to further mix at the merging portion 7 downstream of the amounting increasing pipe with a liquid being treated, which flows down in the amounting increasing pipe 6, whereby floc in the floc-containing liquid serves as core to condense fine particles in the liquid being treated to make mass-floc.

Figure 2:
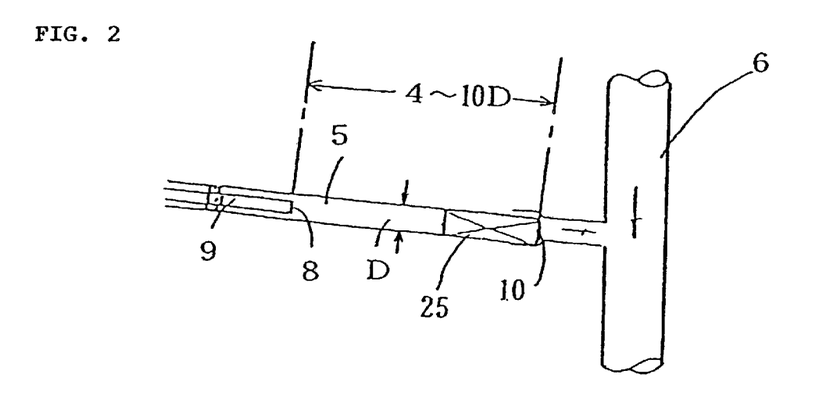
FIG. 2 is a cross sectional view showing a relationship between junction of a mixing pipe and a amount increasing pipe and an opening of an injecting pipe.

As shown in FIG. 2, the spiral injection pipe 9 is disposed in the spiral mixing pipe 5, and the opening 8 at an end of the injection pipe is opened downstream in a position upstream of an outlet 10 of the mixing pipe at a distance of 4 to 10 times a diameter D of the mixing pipe. The amounting increasing pipe 6 is opened to the distribution room 3 above a coagulating cylinder 11, and a liquid 12 being treated is supplied in an overflow fashion to collide and mix with a mixed liquid at the merging portion 7 to be fed via a floc transfer pump 13 to a floc forming tank 14 in the solid-liquid separation unit 2 to be separated into mass-floc and a clean liquid. The distribution room 3 and the dispersion liquid room 4 are disposed at an uppermost portion of the device, and the spiral mixing pipe 5 (the spiral injection pipe 9 inside) and the amounting increasing pipe 6 are extended downward from the chambers to be arranged in the coagulating cylinder 11. The coagulating cylinder 11 of closed construction and the solid-liquid separation unit 2 are communicated to each other through a communication pipe 15, a water level in the coagulating cylinder 11 is adjusted to be enabled to be maintained higher 3 to 50 cm than a water level in the solid-liquid separation unit 2, and an injected liquid 16, a scattered liquid 17 and the liquid 12 being treated are supplied quantitatively. A treated water is drained through a drain pipe 18 in the coagulating cylinder 11.

Figure 1:
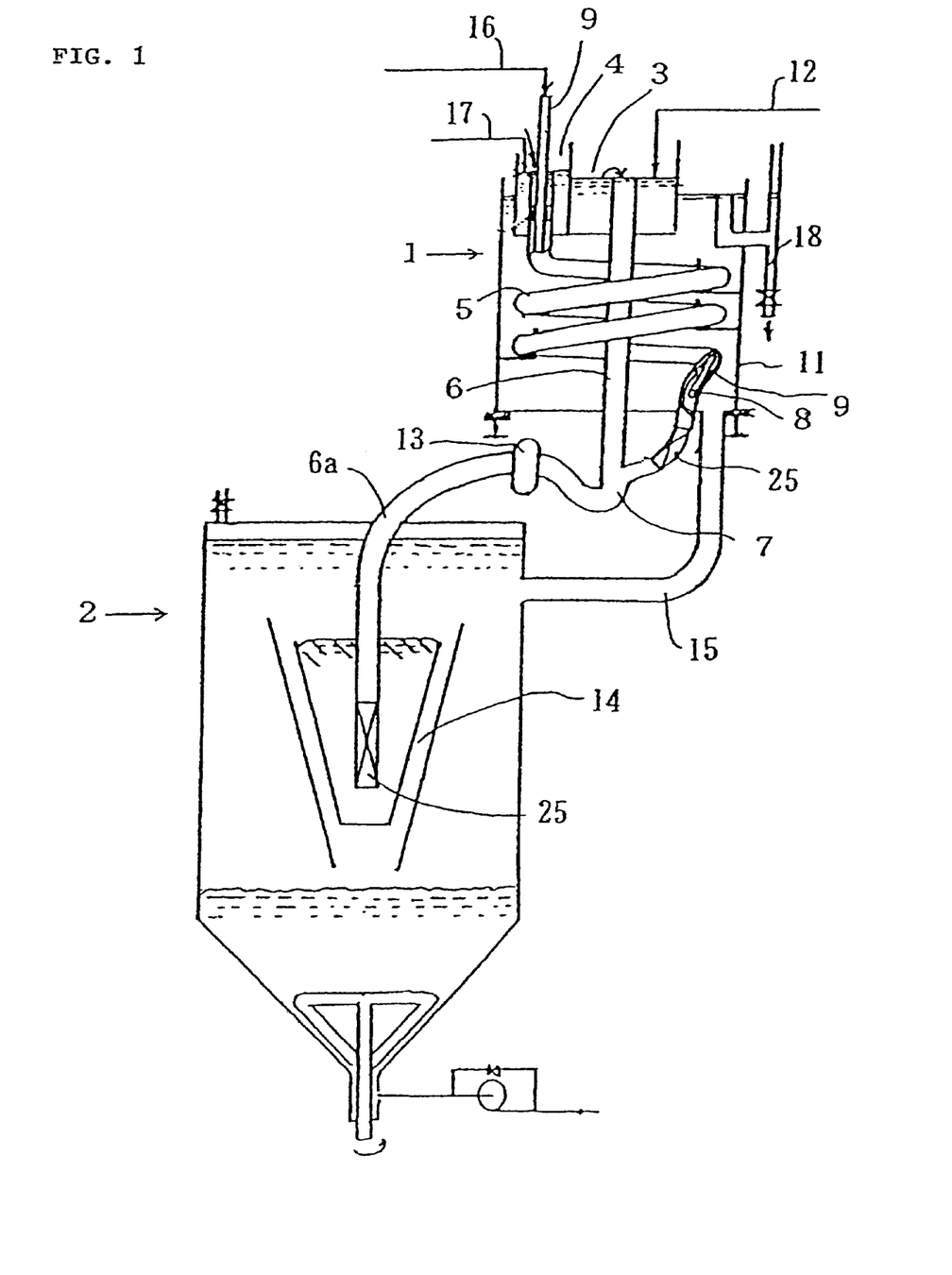
FIG. 1 is a longitudinal cross sectional view showing a coagulating/condensing device provided with a spiral (coiled tube) flocculating pipe.

As seen from FIGS. 1 and 2, a colliding/mixing unit 25 is provided at an end of an extension pipe 6a extended from the spiral mixing pipe 5 and the amounting increasing pipe 6. The colliding/mixing unit 25 functions to increase the number of collision to achieve equalizing of floc diameter to form dense floc.

Figure 3:
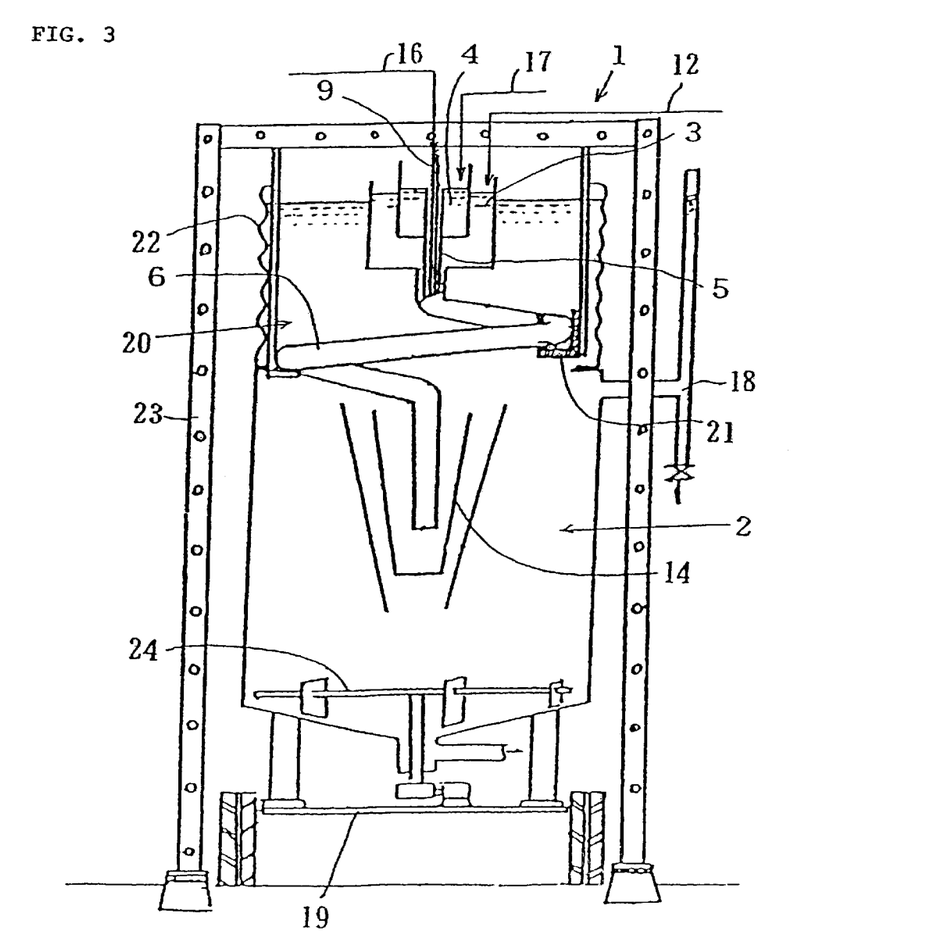
FIG. 3 is a longitudinal cross sectional view showing a coagulating/condensing device provided with a spiral (coiled tube) flocculating pipe mounted on a moving vehicle.

An embodiment shown in FIG. 3 is of the type, in which a solid-liquid separation unit 2 and a coagulating/condensing device can be relocated while being placed on a moving vehicle 19.

The coagulating/condensing device is composed of the solid-liquid separation unit 2 and a liquid feed unit 1 disposed above the separation unit and composed of a distribution room 3 and a dispersion liquid room 4. A spiral mixing pipe 5 for permitting a liquid from the dispersion liquid room to flow down therethrough is provided in a spiral amounting increasing pipe 6 extended from the distribution room 3, and a spiral injection pipe 9 with an opening facing downstream is provided in the spiral mixing pipe, the spiral amounting increasing pipe 6, the spiral mixing pipe 5 and the spiral injection pipe 9 constituting a spiral triple pipe 20. First, two liquids at different electric potentials separately supplied into the spiral mixing pipe 5 and the spiral injection pipe 9 are brought into contact at an opening 8 at an end of the injection pipe with each other to form a floc-containing liquid, which in turn is further made to mix with a liquid being treated, at a merging portion 7 downstream of the amounting increasing pipe 6 to form mass-floc.

With the coagulating/condensing device, the spiral triple pipe 20 of 3.5 m in length is received in a coagulating cylindrical-shaped frame 21 so that the spiral amounting increasing pipe 6 is of 60 cm in height, and connecting pipes connecting between the distribution room 3 and the spiral amounting increasing pipe 6 and between the dispersion liquid room 4 and the spiral mixing pipe 5, respectively, are made of flexible tube. And a bellows cylinder 22 capable of contracting and extending vertically is connected to an upper surface of the solid-liquid separation unit 2 so that water levels in the distribution room 3 and the dispersion liquid room 4 can be adjusted relative to overflow and drain water levels in the solid-liquid separation unit. Upon movements, the bellows cylinder 22 is folded, the distribution room 3 and the dispersion liquid room 4 are separated from the coagulating amounting increasing pipe 6 to be stored in the solid-liquid separation unit, and the bellows cylinder is decreased to a level of 15 cm above the solid-liquid separation unit, thus enabling a mobility. The coagulating cylindrical-shaped frame 21 is supported by a ladder 23 independent of the moving vehicle 19, and pieces of vibration proof rubber are mounted at connections between the ladder and the coagulating cylindrical-shaped frame 21 and at grounding portions of the ladder to prevent vibrations of a rake 24, which serves to discharge coagulated sludge from the solid-liquid separation unit 2, thus suppressing degradation of the coagulating capability.

Figure 4A:
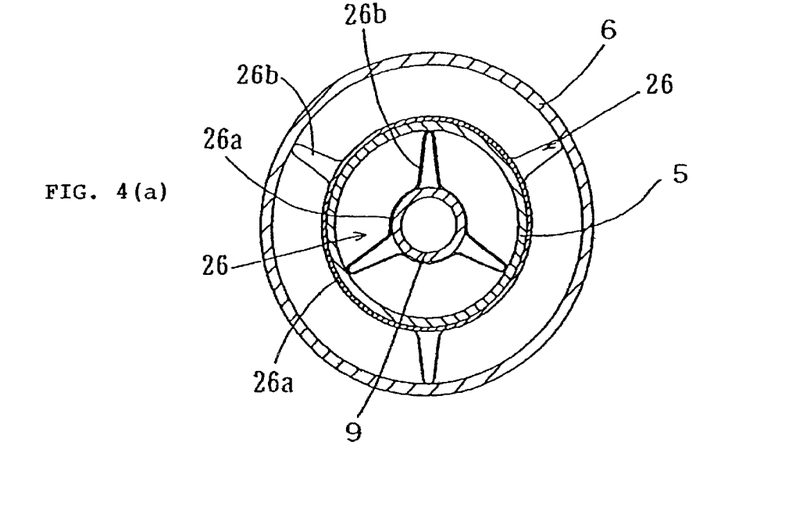
FIGS. 4(a) to 4(c) are views showing a bracket supporting a mixing pipe, an amount increasing pipe and an injecting pipe, FIG. 4(a) being a cross sectional view in a direction perpendicular to an axis, FIG. 4(b) being a cross sectional view in an axial direction, and FIG. 4(c) being a side view showing an example, in which the bracket is mounted to the mixing pipe.
Figure 4B:
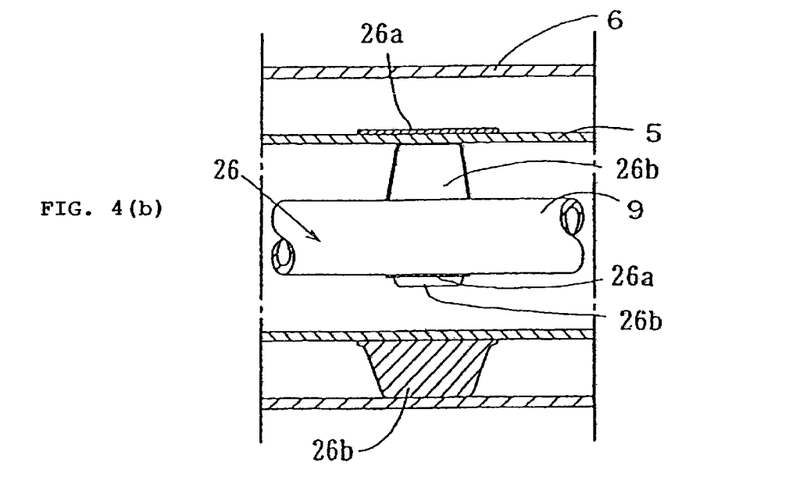
Figure 4C:
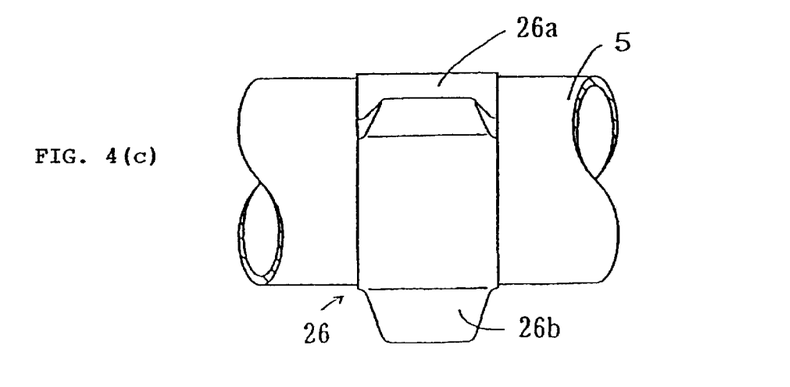

FIGS. 4(a) to 4(c) are views showing an example of a bracket 26 supporting the spiral injection pipe 9 or the mixing pipe 5 in the configuration of a multiple pipe in a multiple fashion, FIG. 4(a) being a cross sectional view in a direction perpendicular to an axis, FIG. 4(b) being a cross sectional view in an axial direction, and FIG. 4(c) being a side view showing an example, in which the bracket is mounted to the mixing pipe 5. The bracket 26 comprises an annular-shaped support portion 26a and a plurality of vane portions 26b so that it is contacted with and supported by an inner wall of the pipe at equal intervals. The vane portions 26b are sharpened at an upstream or downstream side thereof to reduce flow resistance. In an example shown in the figure, the bracket mounted on the mixing pipe 5 is made of a plastic material while the bracket mounted inside of the former bracket is made of a thin metal. Such materials are suitably selected and used depending upon use. The inner and outer brackets may be made of optional materials. Respective axes of the mixing pipe and the injection pipe and respective axes of the amounting increasing pipe and the mixing pipe can be aligned with each other.

Figure 5:
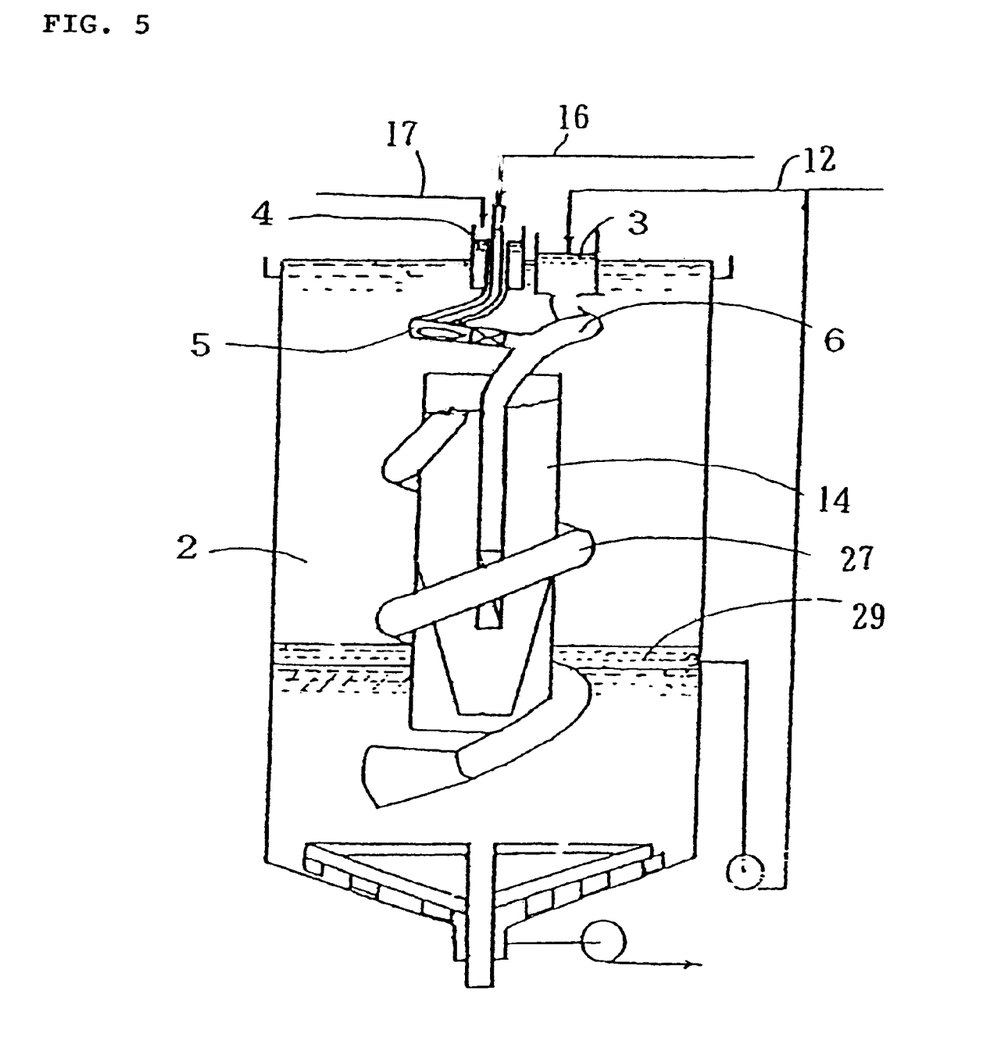
FIG. 5 is a longitudinal cross sectional view showing a coagulating/condensing device of reflocculation including a floc-forming tank provided outside thereof with a spiral down comer.
Figure 6:
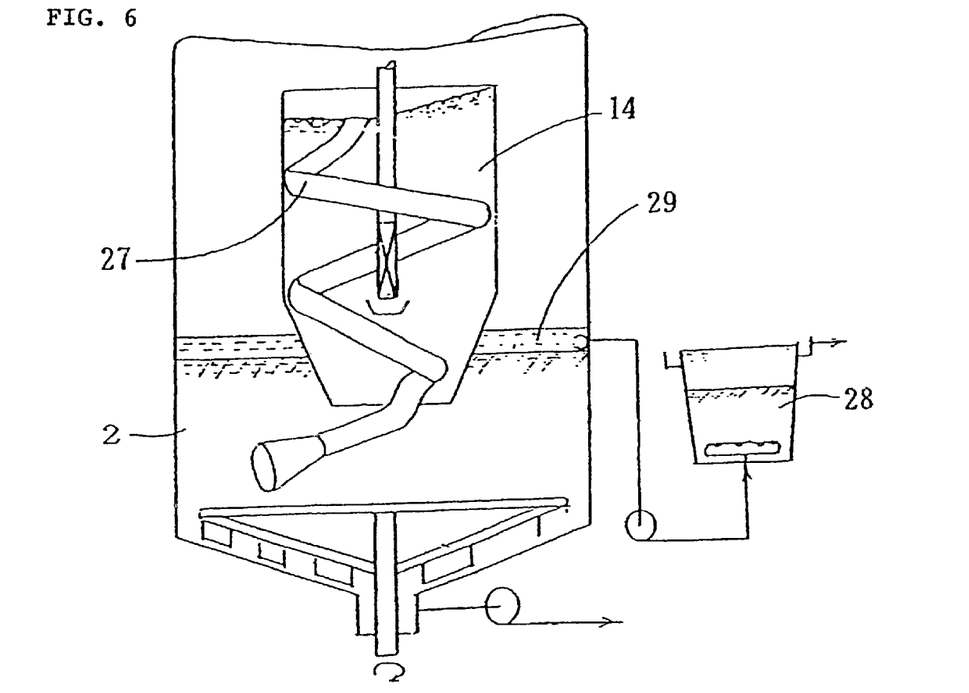
FIG. 6 is a longitudinal cross sectional view showing a coagulating/condensing device of reflocculation including a floc-forming tank provided inside thereof with a spiral down comer.

Examples shown in FIGS. 5 and 6 are constructed such that a distribution room 3 and a dispersion liquid room 4 are provided in an upper portion of a solid-liquid separation unit 2, a spiral mixing pipe 5 for permitting a liquid from the dispersion liquid room 4 to flow down therethrough is made on a downstream side to merge with a spiral amounting increasing pipe 6 from the distribution room, a spiral injection pipe 9 opened toward a downstream side is provided inside the spiral mixing pipe 5, an end of the spiral amounting increasing pipe 6 is disposed inside a floc forming tank 14, a lower portion of which is closed and disposed in the solid-liquid separation unit 2, and a spiral down comer 27 is provided outside (or inside as shown in FIG. 6) of the floc forming tank with an end thereof opened to a bottom of the solid-liquid separation unit. FIG. 6 shows an example, in which a recoagulating tank 28 is provided in the solid-liquid separation unit 2. A peeled small particle floating region 29 in the solid-liquid separation unit 2 is connected to the recoagulating tank 28 to enable recoagulation of such peeled small particles.

Thread form microorganisms generate in an activated sludge treating liquid in an activated sludge treatment facility, in which waste water produced upon washing of rice is treated, and the activated sludge is stable to have a natural sedimentation velocity 1 cm per day, so that it is impossible to coagulate and condense the activated sludge having a concentration of 12,000 ppm. Such thread form microorganism bulking activated sludge of 0.2 liter/min as the injected liquid 16, and a mixed liquid of 0.3 liter/min composed of the activated sludge and city water, a ratio of which is 3:1, as the mixed liquid were brought into laminar contact with each other, and a floc-containing liquid (0.5 liter/min) discharged from the mixing pipe 5 was caused to collide and mix with a liquid being treated in the amounting increasing pipe 6 to provide mass-floc, and a discharge port of the floc-containing liquid transferring pipe was opened to the floc forming tank (of which volume is 150 liter). The injection pipe having an inner diameter of 8 mm, the mixing pipe having an inner diameter of 19 mm, the amounting increasing pipe having an inner diameter of 63.5 mm, and the spiral down comer having an inner diameter of 125 mm were used. The device shown in FIG. 5 was used.

A) A floc-containing liquid having a quantity of 0.5 liter/min and a liquid being treated having a quantity of 4.5 liter/min were supplied to the same floc forming tank with a retention time of 30 minutes.

B) A floc-containing liquid having a quantity of 0.5 liter/min and a liquid being treated having a quantity of 29.5 liter/min were supplied to the same floc forming tank with a retention time of 5 minutes.

As a result, when supplying of the liquid being treated was stopped, B) was lower than A) in fluidized bed level within the floc forming tank, and B) was also greater than A) in sedimentation velocity of the sludge pumped from within the tank.

C) A floc-containing liquid having a quantity of 0.5 liter/min and a liquid being treated having a quantity of 74.5 liter/min were supplied to the same floc forming tank with a retention time of 2 minutes.

As a result, C) was little different from B) in fluidized bed level within the floc forming tank.

D) A floc-containing liquid (1) having a quantity of 0.5 liter/min and a liquid being treated having a quantity of 37.0 liter/min were supplied to the same floc forming tank with a retention time of 4 minutes.

As a result, D) was lower than B) in fluidized bed level within the floc forming tank. Presumably, the reason why B) was higher than D) in fluidized bed level is that growth of floc was slow because the liquid being treated supplied in unit time was small.

The reason why C) was higher than D) in fluidized bed level is judged to be due to a retention time in the floc forming tank being as short as 2 minutes. Thus coagulated and condensed sludge in the solid-liquid separation unit after the lapse of 3 hours since the treatment under the operating conditions B) and C) had a concentration of 11,600 ppm and 11,000 ppm, respectively.

Thus coagulated and condensed sludge containing giant floc in the solid-liquid separation unit after the lapse of 3 hours since the treatment under the operating condition D) and being supplied to the solid-liquid separation unit from the floc forming tank via the spiral down comer was such that an activated sludge (natural sedimentation velocity: 1 cm/day) supplied and contained in a liquid being treated having a concentration of 12,000 ppm was condensed to 13,000 ppm. The peeling-off phenomenon on the sloped plate was not observed during continuous operation in the spiral down comer.

Dense mass-floc (35 to 55 mm in diameter) was formed by causing collision between a floc-containing liquid having a quantity of 0.075 liter/min and a liquid being treated having a quantity of 15 liter/min, which was 200 times the quantity of the floc-containing liquid to extend a retention time in the floc forming tank to 10 minutes, and after the lapse of 4 hours, a bulking activated sludge condensed to 15,000 ppm could be obtained in the solid-liquid separation unit.

Figure 7:
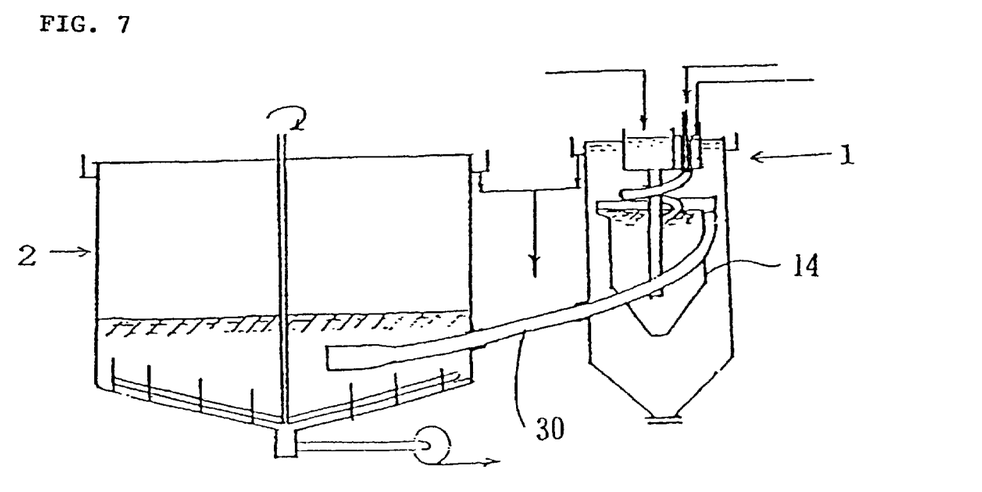
FIG. 7 is a cross sectional view showing an example, in which after solid-liquid separation in a floc forming tank a resulting liquid is further conducted via a conduit to an independent solid-liquid separation unit conventionally installed (existent).

FIG. 7 shows an arrangement, in which after solid-liquid separation effected by the above-mentioned mechanism of the invention in a floc forming tank 14 a resulting liquid is further conducted via a conduit 30 to an independent (existent) solid-liquid separation unit 2 conventionally installed. Here, an example of the use of the device shown in FIG. 7 will be described. A solid-liquid separation unit having a diameter of 3 m and a depth of 4 m and for treating a bulking activated sludge (sedimentation velocity: 2.3 cm/day) is impossible to run, and a floc forming tank 14 is installed to have a liquid feed unit outside thereof and housing therein a spiral coagulating pipe, a floc forming tank and a spiral down comer. The spiral down comer 27 extends through a wall surface of the solid-liquid separation unit, and an enlarged pipe nozzle at a terminal end of the down comer makes a discharge port for mass-floc to be joined. A bulking activated sludge of 0.2 liter/min as the injected liquid 16, and a dispersed liquid (activated sludge 3+city water 1) of 0.3 liter/min were brought into laminar contact with each other to provide a floc-containing liquid 0.5 liter/min, which in turn was caused to collide with a liquid being treated (bulking activated sludge liquid) in the amounting increasing pipe to collide and mix with each other in the floc forming tank with a retention time of 4 minutes to form giant floc, the resulting giant floc being transferred to the solid-liquid separation unit through the spiral down comer opened above the tank and the enlarge pipe nozzle. The coagulating pipe is composed of the injection pipe having an inner diameter of 8 mm, the mixing pipe having an inner diameter of 19 mm, the amounting increasing pipe having an inner diameter of 65 mm, and the two spiral down comers having an inner diameter of 150 mm.

A floc-containing liquid having a quantity of 0.5 liter/min and a liquid being treated having a quantity of 37.35 liter/min were continuously supplied to the floc forming tank, of which volume is 150 liters, during 36 hours with a retention time of 4 minutes, the resulting liquid was supplied to the solid-liquid separation unit from the floc forming tank through the two spiral down comers of 150 mm in inner diameter at 4.5 mm/sec, and after the lapse of 10 hours since then, sludge thus condensed was made to provide a bulking activated sludge of 13,400 ppm with the liquid being treated having a concentration of 3,200 ppm. Thus condensation amounting to 4.1 times was resulted. Drain water from the solid-liquid separation unit was 5 to 13 ppm in terms of MLSS. A surface loading on the solid-liquid separation unit is 7.7 $m^3/m^2$ day.

Figure 8:
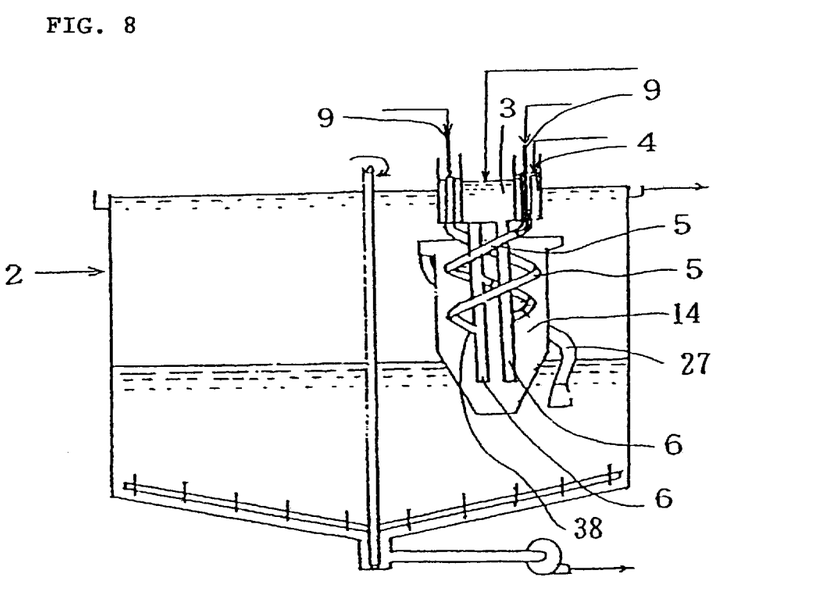
FIG. 8 is a cross sectional view showing an example of a coagulating/condensing device, in which spiral mixing pipes are joined to a plurality of amount increasing pipes, respectively.

FIG. 8 shows a construction of the double type, in which a distribution room 3 and a dispersion liquid room 4 are provided in an upper portion of a solid-liquid separation unit 2, two spiral mixing pipes 5, 5 for permitting a liquid from the dispersion liquid room 4 to flow down therethrough merge on a downstream side with two spiral amounting increasing pipes 6, 6 extended from the distribution room 3, and spiral injection pipes 9 are provided within the respective spiral mixing pipes 5, 5 to be opened toward a downstream side. Ends of the two spiral amounting increasing pipes 6, 6 are disposed inside a floc forming tank 14, a lower portion of which is closed, and a spiral down comer 27 is extended from the floc forming tank and provided inside the solid-liquid separation unit 2.

Figure 9:
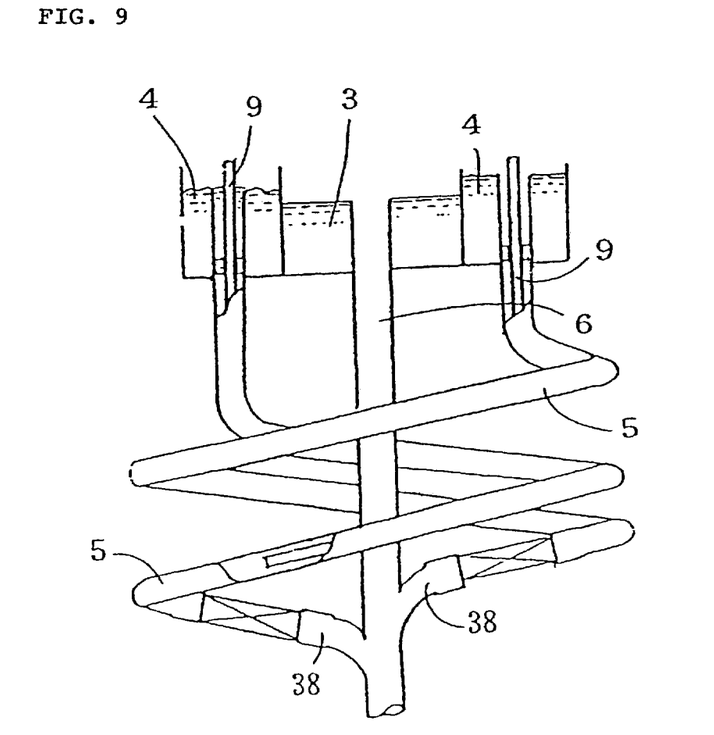
FIG. 9 is a side view showing an example, in which a plurality of spiral mixing pipes are joined to a single amount increasing pipe, with a part broken away.

FIG. 9 shows an example, in which a plurality of spiral mixing pipes 5 having therein injection pipes 9 are joined on a downstream side to a plurality of collecting pipes 38 on a single amount increasing pipe 6. A dispersion liquid room 4 may be composed of a plurality of chambers or may be provided on an outer periphery of a distribution room 3 in a doughnut fashion.

Figure 10:
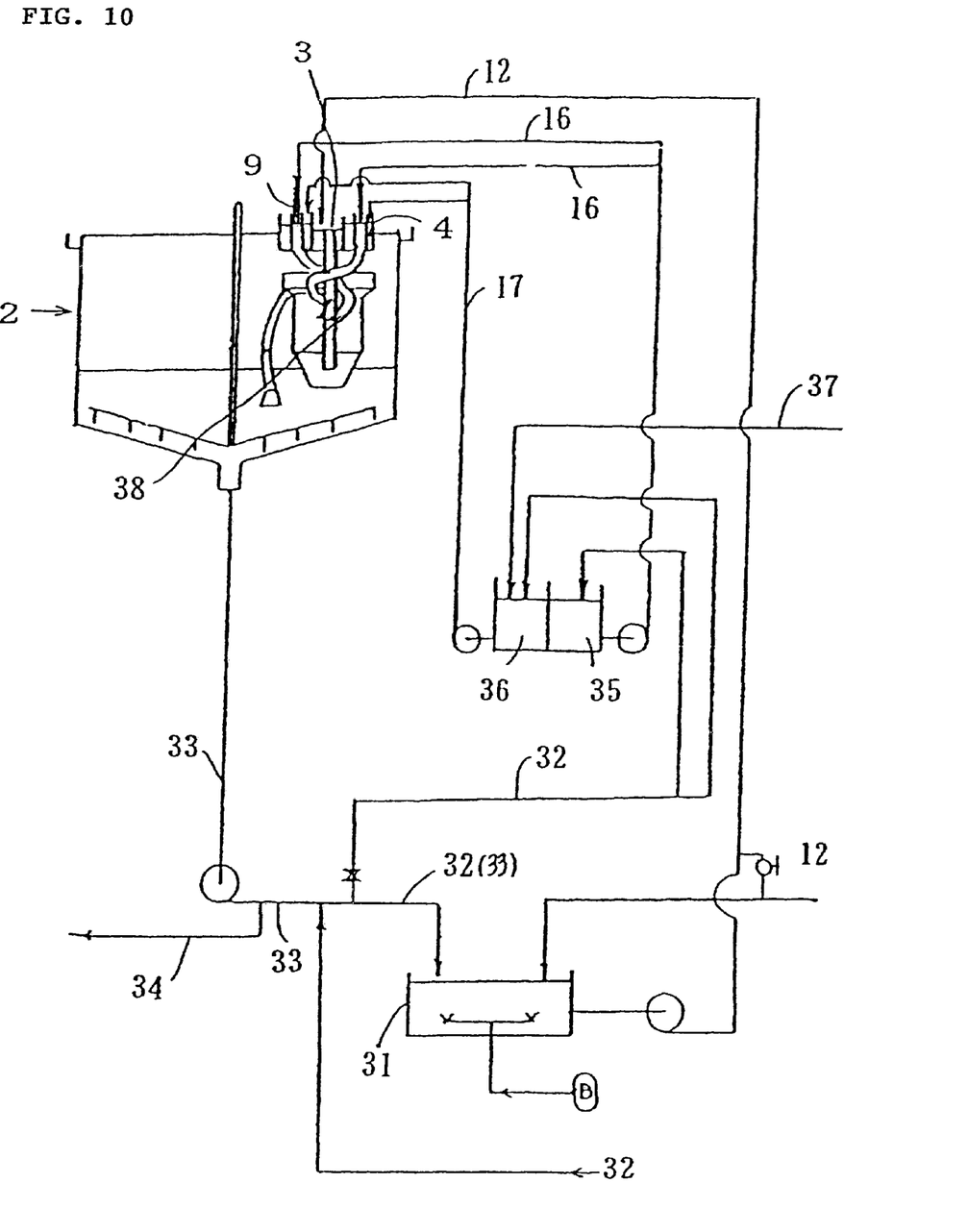
FIG. 10 is a view showing a system of a coagulating/condensing device according to an embodiment of the invention.

FIG. 10 is a view showing a system of a coagulating/condensing device according to an embodiment of the invention. A liquid 12 being treated, a scattered liquid 17 and an injected liquid 16, which serve to attain the object of coagulating treatment, are supplied to the distribution room 3, the dispersion liquid room 4 and the injection pipes 9, respectively. Industrial liquid waste and so on as it is may be supplied as the liquid 12 being treated, and an activated sludge 32 and a coagulated mixed sludge 33 from the solid-liquid separation unit 2 may be added to the liquid 12 being treated, in a mixing tank 31 as shown in the figure. The coagulated mixed sludge 33 from the solid-liquid separation unit 2 is relieved of solid materials 34 to be in a liquid state. The injected liquid 16 and the scattered liquid 17, respectively, are adjusted in an injected liquid adjusting tank 35 and a scattered liquid adjusting tank 36, respectively, with the use of an activated sludge 32 and city water 37 so as to provide a difference in concentration (that is, potential difference), and are transferred by means of a pump. A substance, which should be inherently disposed of, is utilized to perform coagulating treatment with a large quantity of a liquid being treated as an extending liquid, without the use of any coagulant.

Here, the efficacy of replacing a straight pipe by a spiral pipe to serve as a coagulating pipe was investigated.

The coagulating pipe in the form of a double pipe, in which a mixing pipe in the form of a straight pipe is disposed outside and an injection pipe in the form of a straight pipe is disposed inside, is such that the injection pipe has a diameter of 20 mm, and the mixing pipe has a diameter of 67 mm and comprises a transparent pipe having a diameter of 6.5 mm, and the coagulating pipe is installed toward a downstream side at a down grade of 5 degrees relative to the horizontal with axes of the mixing pipe and the injection pipe substantially aligned in the coagulating pipe. An injected liquid supply tank is arranged in a mixed liquid supply tank, and an inlet at one end of the mixing pipe is opened to a side wall of a scattered liquid chamber while the other end thereof distant 6.5 mm away therefrom is opened to a floc forming tank within a solid-liquid separation unit. Injection pipes opened to the injected liquid supply tank are extended to pass the inlet of the mixing pipe, and are in the form of a double pipe having a length of 1.25 m, 2.5 m and 5 m with a discharge port of the injection pipe (opening) opened into the mixing pipe. Floc coagulated is disposed on a bottom of the mixing pipe to extend downstream from a position of a distance two times a diameter of the mixing pipe as measured from the discharge port of the injection pipe while a supernatant liquid is distinctly disposed in an upper portion of the pipe. Clarity of the supernatant liquid above floc disposed in a position of a length of the injection pipe plus 0.2 to 1 m was used for judgment, and an activated sludge was supplied to the injection pipe at a rate of a milliliter/min while a mixed liquid (activated sludge/city water=5/1) was supplied to the mixing pipe at a rate of 5a milliliter/min. Meanwhile, respective amounts of the injected liquid and the scattered liquid (mixed liquid) were found as maximum flow rates, at which floc was formed depending upon respective lengths of the pipes, when the coagulating pipe composed of the mixing pipe, which was in the form of a double pipe with the injection pipe having a diameter of 20 mm and the mixing pipe (transparent pipe) having a diameter of 63 mm and with the injection pipe having a length of 1.25 m and the mixing pipe having a length of 2.5 m and which was wound to make a spiral pipe having a diameter of 500 mm, was connected to a floc forming tank and when clarity (SS 20 ppm) of the supernatant liquid above floc disposed in a position of a length of the injection pipe plus 0.2 to 1 m was substantially the same as that in the case of a straight pipe. The result is indicated in TABLE 1.

TABLE 1

| Pipe length | Maximum flow rate | Amount of injected liquid + amount of mixed liquid |
|---|---|---|
| In the case of straight pipe | | |
| 1.25 m | 1.1 L/min | (0.2 + 0.9) L/min |
| 2.5 | 2.3 | (0.4 + 1.9) |
| 5.0 | 4.2 | (0.7 + 3.5) |
| In the case of spiral mixing pipe (coiled pipe) | | |
| 1.25 m | 13.7 L/min | (2.3 + 11.4) L/min |

It was indicated that when a length of the injection pipe in the case of a straight pipe becomes two-fold, the maximum flow rate becomes two-fold, and when a length of the injection pipe becomes four-fold, the maximum flow rate also becomes four-fold.

A maximum flow rate with the spiral pipe having a length of 1.25 m provides a floc-containing liquid approximately 13 times that with a straight pipe having a length of 1.25 m. This is because of stability in formation of laminar flow in the spiral pipe, and reveals that it is easy to obtain a laminar flow having a large flow rate with a spiral mixing pipe (mixing pipe), which includes an injection pipe within a mixing pipe. Since a liquid being treated can naturally be supplied at a rate 3 to 300 times that with a floc-containing liquid, the coagulating/condensing device according to the invention achieves miniaturization, by which it can be installed on existing precipitators, and besides an increase in capability to thirteen-fold can be obtained at the same time.

It is essential to prevent unreacted contaminated liquid from flowing out when drainage into an area of environmental protection from the present device is to be effected. To this end, a floc-containing liquid must be surely formed. To enhance safety and reliability, a fundamental construction for preventing flowing-out of unreacted contaminated liquid is such that a spiral mixing pipe in the form of a double pipe composed of a plurality of injection pipes and a mixing pipe is joined to a single amount increasing pipe and one to three of such amount increasing pipes are installed within a floc forming tank. The present device shown in FIGS. 8 and 9 has a capability of contaminated liquid treatment, a minimum value of which is 13 L/min×60=780 liter/min≅1,120 $m^3$/day [two spiral mixing pipes provides ×2, mixing with a liquid 3 to 300 times a liquid being treated provides ×15, and two amount increasing pipes provides ×2=×2×15×2=×60].

According to the invention, it is possible to coagulate and treat a thin contaminated liquid B, which has a low concentration of 500 ppm and is be low mesh of a paper machine having a large capacity, without the use of any coagulant. Such embodiments are indicated below.

1) A mixing pipe having a straight pipe diameter of 67 mm and a length of 1.25 mm and an injection pipe having a straight pipe diameter of 20 mm and a length of 1 m were aligned in axis, and a mixed liquid (B liquid 10: city water 2) of 1.75 liter/min and an injected liquid B of 0.35 liter/min, respectively, were supplied to be brought into laminar contact with each other, with the result that any floc was not formed. This is because the liquid being treated was as thin as 500 ppm and so a distance between particles for collision was too great to form floc.

2) When a liquid of 3,600 ppm obtained by thickening a A liquid being the same contaminated liquid resulted from paper manufacture was brought into laminar contact with a mixed liquid (A liquid 10: city water 2) of 1.75 liter/min and an injected liquid A liquid of 0.35 liter/min, respectively, which were supplied into a set of coagulating pipes being the same straight pipe as that supplied with the thickened liquid, floc was formed. However, a greater amount of the liquids delivered resulted in non-formation of laminar flow to generate eddy current, thus not forming floc.

3) An easily available activated sludge (C liquid) having a high-concentration of 8,000 ppm was selected as a liquid for formation of floc, a mixed liquid [(C liquid) 9: city water 2) of 9 liter/min was supplied to a spiral mixing pipe (inner diameter 63.5 mm) having a length of 1.25 m, and an injected liquid (C liquid) of 2.2 liter/min was supplied to a spiral injection pipe (inner diameter 19 mm) having a length of 1 m. With respect to a capability of formation of a floc-containing liquid in a spiral coagulating pipe in the form of a double pipe having the same pipe length, the cases 2) and 3) are compared with each other.

The case 3) provides the spiral coagulating pipe (9+2.2)=11.2 liter/min.

The case 2) provides an amount of the spiral coagulating pipe being a straight pipe (1.75+0.35)=2.1 liter/min.

Thus the use of the spiral coagulating pipe and a difference between a high-concentration injected liquid of 8,500 ppm and a high-concentration mixing liquid of 3,600 ppm selected for formation of a floc-containing liquid resulted in the same processing capacity as that of five coagulating pipes in the form of a straight pipe (11.2 liter/min versus 2.1 liter/min, that is, about five-fold).

It was confirmed that since an amount increasing liquid could treat a liquid being treated of an amount 3 to 300 times an amount of a floc-containing liquid, an amount of about 35.7-fold, that is, 11.2 liter/m×35.7=400 liter/min was treated.

It was found that sludge of 12.5 liter/min was taken out of a coagulated mixed sludge (fine particles resulted from paper manufacture plus activated sludge) of 8,000 ppm, which was precipitated in the solid-liquid separation unit upon supplying of activated sludge having 8,000 ppm and 200 liter/min, sufficed to treat a thin liquid having 500 ppm and 200 liter/min.

In the experiment, a single amount increasing pipe (diameter 150 mm) was installed in the floc forming tank and a single spiral mixing pipe was joined to the single amount increasing pipe, while it is possible to treat a liquid of 400 liter/min=24 m$^3$/h×2×2=96/m$^3$/h=2,300 m$^3$/day with an actual device, in which two amount increasing pipes are installed in the floc forming tank as shown in FIG. 8 and at least two spiral mixing pipes are joined to the single amount increasing pipe as shown in FIG. 9. Being constructed in the above-mentioned manner, the invention gives the following effects.

When a spiral pipe (coiled pipe, volute pipe, arcuate pipe) is used, it is high in stability of laminar flow as compared with a straight pipe and is 10 times as high in capacity of feeding liquid treatment as a straight pipe, so that only the provision of a spiral coagulating pipe can ensure a required amount of floc-containing liquid. In aligning axes of an injection pipe and of a mixing pipe in order to ensure laminar flow, there is no need of the same accuracy as that for a straight pipe. The coagulating/condensing device can be made as small as ⅕ in height and ⅓ to ⅒ in volume. Therefore, the coagulating/condensing device according to the invention can be installed on most existing solid-liquid separation units.

The coagulating/condensing device according to the invention can be loaded on a moving vehicle, and becomes easy to move and relocate in accordance with contaminated liquid treatment over long and short term. It is possible to considerably reduce cost for coagulating installation.

When the coagulating/condensing device according to the invention is installed on a solid-liquid separation unit for activated sludge, a complete installation results, in which bulking sludge having a sedimentation velocity of 1 cm/day precipitates at a 10,000-fold velocity, a total amount of sludge in an aeration tank increases two-fold to four-fold, sludge loading of $BOD_{20}$ becomes below 0.06 kg/kg·day, cost for treatment and disposal of surplus sludge, which has been necessitated over long days since the development of the activated sludge method, becomes almost evitable, water quality has attained 99% or more of rejection for $BOD_5$, and a contaminated liquid makes a clean liquid and discharges only $CO_2$ and $N_2$. Of course, maintenance cost for coagulating (agent) devices, sludge condensing tanks, filtering devices, incineration facilities, and sludge disposal sites has become unnecessary, and cost for newly installed coagulating/condensing devices can be cancelled by cost for treatment and disposal of surplus sludge, which has become unnecessary, and so can be redeemed in a short term.

A coagulating/condensing device up to one having a capacity of 3,000 m$^3$/day is manufactured in a factory and a main construction work in a construction site comprises piping connection in the vicinity to make an installation work short, so that shutdown duration, which is not desirable in environmental facilities, can be made short.

In discharging mass-floc from the floc forming tank, a spiral down comer is used to enable adjusting a falling velocity of mass-floc by means of an inclination of the down comer depending upon the nature of floc, whereby mass-floc descending in the down comer from the floc forming tank makes a continuous moving layer without floc gaps to enable discharging continuously, so that the peeling-off phenomenon of fine particles disappears almost.

A coagulated/condensed sludge layer is usually liable to generate on an interface between a coagulated/condensed sludge deposited on the solid-liquid separation unit and a supernatant liquid. Fine particles peeled off mass-floc are reduced by sucking a peeled-off small particle containing liquid on surfaces of the sludge layer by means of a suction pump, returning the liquid to a supply pipe of a liquid being treated, and continuously supplying the liquid to a system, which performs recoagulation within the floc forming tank, to treat the same, and by reduction of a conveying velocity in the above-mentioned spiral down comer, and so a favorable result has been obtained in preventing the supernatant liquid from being soiled by peeled-off small particles.

When a plurality of amount increasing pipes, each of which includes a plurality of collecting pipes joined to discharge ports of a plurality of spiral coagulating pipes having a colliding/mixing portion, are installed within a floc forming tank, a floc-containing liquid and a liquid being treated, within the plurality of coagulating pipes collide with each other in the amount increasing pipes or in the floc forming tank to necessarily form floc even when either of an injected liquid and a mixed liquid is not supplied, so that an unreacted contaminated liquid is inhibited from being discharged to a water area of environmental protection, and so a device is resulted, which is improved in capacity of treatment and can ensure safety.

INDUSTRIAL APPLICABILITY

Objects, which the coagulating/condensing device and method according to the invention are used to coagulate and condense, include separation and removal of earth and sand, heavy clay, and sludge resulted from such a work as dredging, digging, bulkhead and so on, removal of sludge deposited on dams, reservoirs, sea, lakes and marshes, and ditches, removal of sludge and food remaining in fish farms and cultural fish site, pretreatment of tap water and water, removal of red tide, the high-concentration activated sludge method, coagulation/separation of bulking activated sludge, condensing/separation of zooplankton and phytoplankton, removal of green algae, recovery of valuable substances from waste water, coagulation/separation of a contaminated liquid (pulp waste below mesh on paper machines) being thin and in large quantity, removal of harshness such as fine particles in agricultural products, coagulation/separation in other washing processes, condensing/separation of fermented liquor and valuable liquid, solid-liquid separation in other production processes, solid-liquid separation of waste water discharged from production processes, and so on.

The device is made small-sized to thereby become capable of being loaded on a moving vehicle, so that objects for condensing/separation are various, and so the device is abundant in general-purpose.

What is claimed is:

1. A coagulating/condensing device comprising a liquid supplying unit for supplying a liquid being treated containing fine particles, and a solid-liquid separation unit disposed in a lower position than the liquid supplying unit, the liquid supplying unit comprising a delivering chamber for delivering a liquid being treated, and a liquid dispersing chamber, and wherein a spiral mixing pipe for permitting a liquid from the liquid dispersing chamber to flow down therethrough and an amount increasing pipe for supplying from the delivering chamber a liquid being treated are joined together at a merging portion disposed downstream, a spiral injection pipe with an opening facing downstream is provided in the spiral mixing pipe, two liquids at different electric potentials supplied separately to the spiral mixing pipe and the spiral injection pipe are caused to contact with each other at the opening to form a floc-containing liquid, and the floc-containing liquid is further made to mix with the liquid being treated at the merging portion downstream of the amount increasing pipe to be made a mass-floc.

2. The device according to claim 1, further comprising a colliding/mixing unit provided in the vicinity of a portion where an end of the spiral mixing pipe merges with a liquid which flows down through the amount increasing pipe.

3. A coagulating/condensing device composed of a solid-liquid separation unit and a delivering chamber and a liquid dispersing chamber, both of said delivering and liquid dispersing chambers are disposed above the solid-liquid separation unit, and further comprising a spiral mixing pipe provided in a spiral amount increasing pipe extended from the delivering chamber for permitting a liquid from the liquid dispersing chamber to flow down therethrough, and a spiral injection pipe provided inside the spiral mixing pipe and having an opening facing downstream, and wherein the spiral amount increasing pipe, the spiral mixing pipe and the spiral injection pipe constitute a spiral triple pipe, and two liquids at different electric potentials supplied separately to the spiral mixing pipe and the spiral injection pipe are caused to contact with each other at the opening to form a floc-containing liquid, which further mixes with the liquid being treated at a merging portion downstream of the amount increasing pipe to be made a mass-floc.

4. The device according to claim 1 or 3, further comprising a bracket for coaxially supporting the spiral injection pipe within the spiral mixing pipe and the spiral mixing pipe with the amount increasing pipe, the bracket comprising a plurality of vane portions, which are contacted with and supported by the inner wall of respective pipes at predetermined intervals, the vane portions being sharpened at an upstream or downstream side thereof to reduce flow resistance.

5. A coagulating/condensing device composed of a delivering chamber and a liquid dispersing chamber, both of said delivering and liquid dispersing chambers are disposed above a solid-liquid separation unit, and further comprising a spiral mixing pipe for permitting a liquid from the liquid dispersing chamber to flow down therethrough, the spiral mixing pipe being made to merge on a downstream side with a spiral amount increasing pipe extended from the delivering chamber, a spiral injection pipe provided inside the spiral mixing pipe and having an opening facing in a downstream direction, a floc forming tank provided to have a lower portion thereof closed and disposed in the solid-liquid separation unit, the spiral amount increasing pipe having an end thereof disposed inside the floc forming tank, and a spiral down comer provided outside or inside the floc forming tank and having an end thereof opened to the solid-liquid separation unit.

6. A coagulating/condensing device composed of a delivering chamber and a liquid dispersing chamber, both of said delivering and liquid dispersing chambers are disposed above a solid-liquid separation unit, and further comprising a plurality of spiral mixing pipes for permitting a liquid from the liquid dispersing chamber to flow down therethrough, the plurality of spiral mixing pipes being made to merge on a downstream side with a plurality of spiral amount increasing pipes extended from the delivering chamber, or the plurality of spiral mixing pipes being provided in the plurality of spiral amount increasing pipes to constitute multiple pipes, spiral injection pipes provided inside the respective spiral mixing pipes and having an opening facing in a downstream direction, a floc forming tank provided to have a lower portion thereof closed and disposed in the solid-liquid separation unit, the plurality of spiral amount increasing pipes having ends thereof disposed inside the floc forming tank, and a spiral down comer provided extended from the floc forming tank.

7. A coagulating/condensing method comprising the steps of: causing an injected liquid and a scattered liquid, both of said injected and scattered liquids are at different electric potentials, to flow down by way of a mixing pipe composed of an outer pipe and an inner pipe, each of which is formed in a spiral configuration, bringing the liquids into contact with each other on a downstream side of said mixing pipe to make a floc-containing liquid, and mixing the floc-containing liquid with a liquid being treated containing therein fine particles, to form mass-floc to thereby perform solid-liquid separation.

* * * * *